United States Patent
Chaudhry

(12) 
(10) Patent No.: US 6,282,075 B1
(45) Date of Patent: Aug. 28, 2001

(54) SURGE SUPPRESSOR WITH VIRTUAL GROUND

(75) Inventor: Nisar A. Chaudhry, Huntington Station, NY (US)

(73) Assignee: Tii Industries, Inc., Copiague, NY (US)

( * ) Notice: Subject to any disclaimer, the term of this patent is extended or adjusted under 35 U.S.C. 154(b) by 0 days.

(21) Appl. No.: 09/266,118

(22) Filed: Mar. 10, 1999

(51) Int. Cl.[7] ........................................... H02H 3/00
(52) U.S. Cl. ........................ 361/111; 361/118; 361/42
(58) Field of Search .................... 361/42, 45, 115, 361/111, 118

(56) References Cited

U.S. PATENT DOCUMENTS 6,023,400 * 2/2000 Nevo ........................................ 361/42

\* cited by examiner

*Primary Examiner*—Stephen W. Jackson
(74) *Attorney, Agent, or Firm*—Morgan & Finnegan, L.L.P.

(57) ABSTRACT

A surge suppressor which provides overvoltage protection for AC power lines, coaxial transmission lines and communication lines using a virtual ground rather than a separate ground conductor.

12 Claims, 4 Drawing Sheets

SURGE SUPPRESSOR WITH VIRTUAL GROUND

BACKGROUND OF THE INVENTION

1. Field of the Invention

The present invention relates to surge suppressors for protecting AC power lines, coaxial transmission lines and communication lines from overvoltage conditions using a virtual ground rather than a separate ground conductor.

2. Discussion of the Related Art

Today many homes and buildings use sensitive electronic equipment such as home entertainment centers with expensive audio/visual equipment, personal computers, modems, printers, copiers, facsimile machines and telephone answering machines This sensitive electronic equipment is connected to the outside world by AC power lines, coaxial transmission lines (both cable TV, satellite dish antennas and broadband internet connections) and communication lines (telephone, facsimile and high speed data). Because the electronic equipment is expensive, there is a need to protect the equipment from voltage surges occurring on the AC power lines, the coaxial transmission lines and the communication lines.

To fill this need a number of companies have developed plug in secondary surge suppressors which are designed to plug into AC wall outlets which carry a separate ground conductor and which accept three prong AC plugs. The electronic equipment, which also has a three prong AC plug, is then plugged into the secondary surge suppressor. Some plug in secondary surge suppressors currently available also provide overvoltage protection for coaxial transmission lines and/or communication lines. See, for example, Cawley U.S. Pat. No. 4,438,477 issued Mar. 20, 1984, which discloses a plug in secondary surge suppressor which protects both AC power lines and communication lines from overvoltage conditions using the ground obtained from the AC outlet by means of a three prong AC plug.

While newly-built homes and buildings have AC outlets which carry a separate ground wire and accept three prong AC plugs, older homes and buildings have AC outlets which only accept two prong AC plugs. Therefore, plug in secondary surge arrestors currently being marketed (which have three prong AC plugs and use the ground from the AC outlet to provide overvoltage protection) cannot be used in older homes and buildings with AC outlets which only accept two prong AC plugs. A need therefore exists for a plug in secondary surge suppressor which can be used with AC outlets which only accept two prong AC plugs.

SUMMARY OF THE INVENTION

The present invention provides a plug in secondary surge suppressor which utilizes a two wire AC power source (no separate ground wire) to protect electrical equipment having three prong AC plugs. The surge suppressor of the present invention provides such overvoltage protection by creating a "virtual ground", i.e., a return path to the two wire AC power source through which voltage surges appearing on coaxial transmission lines and/or communication lines may be directed. The present invention fills the need for a surge suppressor which protects electrical equipment having three prong AC plugs and which can be used in homes and buildings equipped with AC outlets which will only accept two prong AC plugs.

The subject matter which I regard as my invention is more particularly pointed out in the claims at the end of the specification. The invention, including its method of operation and its numerous advantages, may best be understood by reference to the following description taken in conjunction with the accompanying drawings wherein like reference numerals refer to like components.

DETAILED DESCRIPTION

Figure 1:
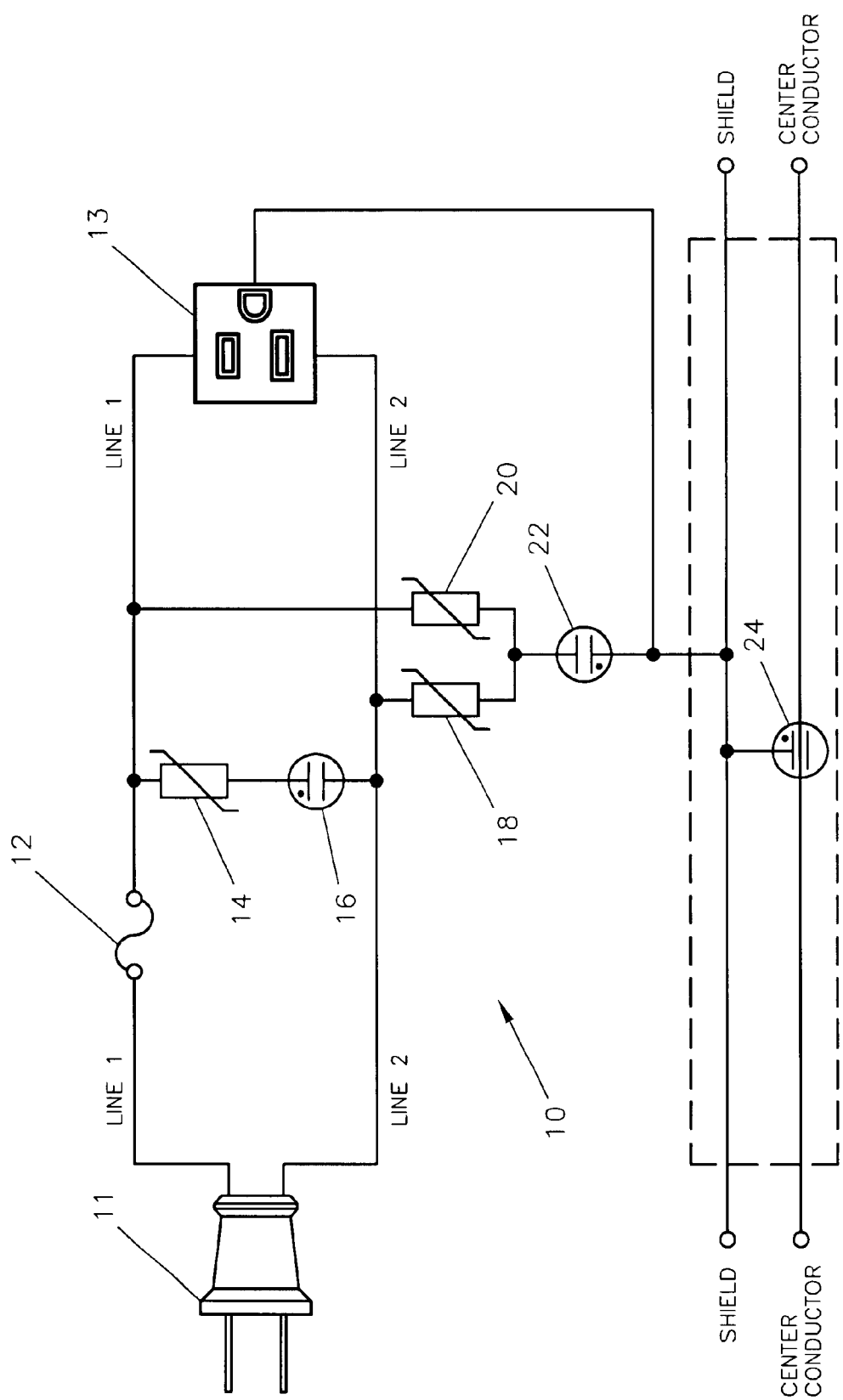
FIG. 1 is a schematic diagram of one embodiment of the present invention.

FIG. 1 is a schematic diagram of one embodiment of the present invention. As shown in FIG. 1, surge suppressor 10 protects against overvoltage conditions appearing on the AC power lines and on a coaxial transmission line. Line 1 and Line 2 are adapted to be connected to a source of AC power by a two prong AC power plug 11. The AC power may, for example, be 110 volts or 220 volts. If the AC power is 110 volts, Line 1 may be hot and Line 2 may be the neutral. Alternatively, Line 1 may be the neutral and Line 2 may be hot. The invention will function properly in either event. In the preferred embodiment Line 1 is hot and Line 2 is the neutral. Surge suppressor 10 also contains a receptacle 13 which accepts a three prong AC plug. The ground conductor of receptacle 13 is connected to a virtual ground. Thus, surge suppressor 10 provides overvoltage protection for electrical devices which come with three prong AC plugs even though the surge suppressor plugs into an AC receptacle which only receives two prong AC plugs and does not carry a separate ground wire.

In FIG. 1, fuse 12 is a thermal sensing fuse which provides overcurrent production. A suitable thermal sensing fuse is available from Microtemp Corp. under part number 4178A1. MOV 14 and gas discharge tube 16 comprise an AC overvoltage protection circuit which protects against voltage surges appearing across Line 1 and Line 2. A suitable MOV 14 is available from Harris Semiconductor Corp., P.O. Box 883, Melbourne, Fla. 32902 under part number V130LA20B. A suitable gas discharge tube 16 is available from TII Industries, Inc., Copiague, N.Y. under part number TII 44, which has a breakdown voltage between 300 and 500 VDC. Gas discharge tube 16 substantially eliminates leakage current through MOV 14.

Figure 4:
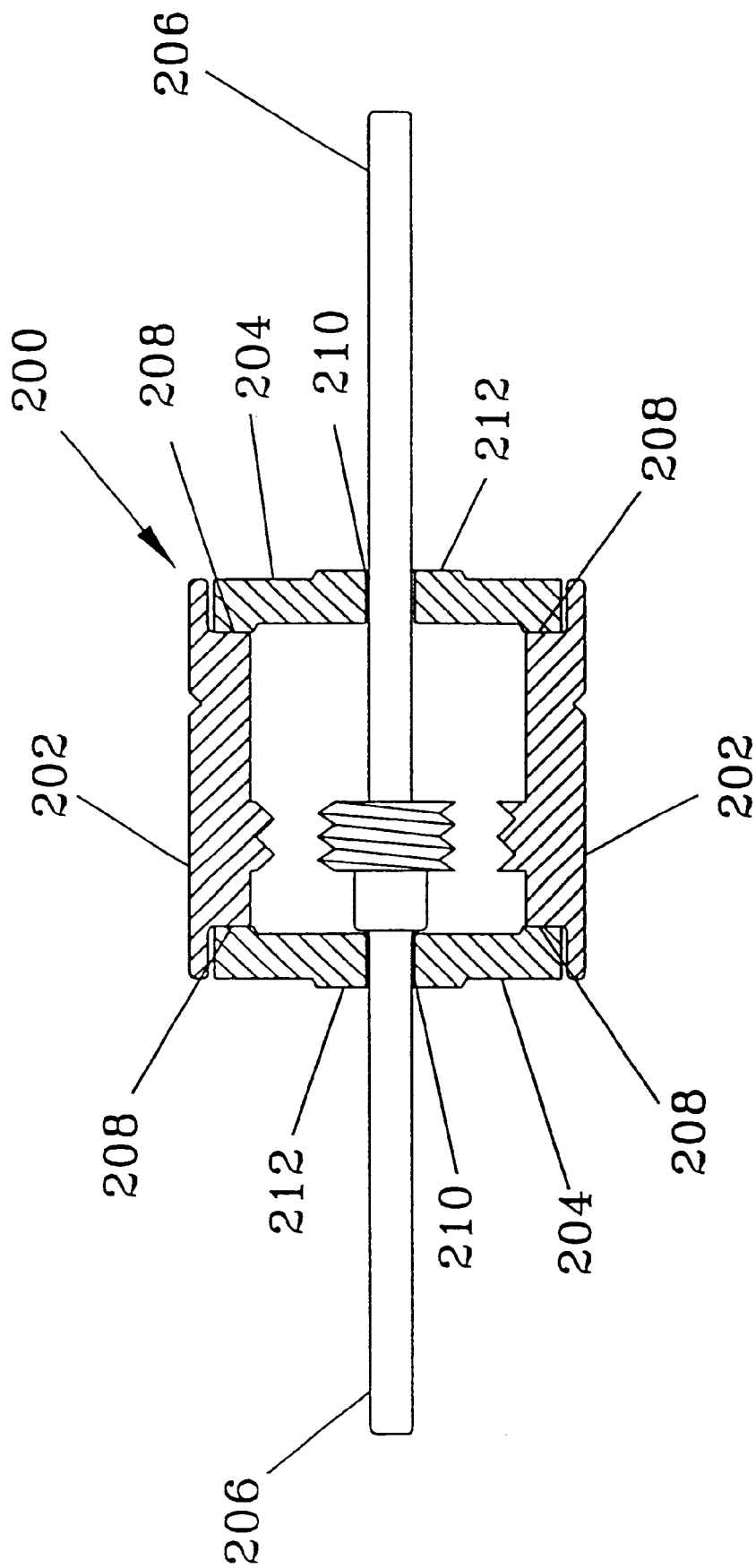
FIG. 4 is a cross sectional view of a coaxial surge arrestor suitable for use with the embodiments shown in FIGS. 1 and 2.

The embodiment of the invention shown in FIG. 1 also provides overvoltage protection for a coaxial transmission line. The shield and center conductor of the coaxial transmission line are connected to a coaxial transmission line overvoltage protection circuit comprising a coaxial gas discharge tube 24. A coaxial gas discharge tube is shown in FIG. 4, which is described in detail later. A suitable coaxial gas discharge tube is available from TII Industries under part number 00173004, which has a breakdown voltage between 150 and 300 VDC. MOVs 18 and 20 and gas discharge tube 22 are connected between gas discharge tube 24 and the AC power lines and provide a "virtual ground" for the coaxial transmission line overvoltage protection circuit, i.e., a return path for voltage surges appearing on the coaxial transmission line. The voltage surge on the coaxial transmission line will flow to either Line 1 or Line 2, depending on which is at the lower potential. Gas discharge tube 22 may also be a TII 44 tube, while MOV 18 and MOV 20 may be the same as MOV 14. While FIG. 1 shows MOVs 18 and 20 connected in series with two electrode gas discharge tube 22, MOVs 18 and 20 could be connected in series with a three electrode gas discharge tube. See MOVs 56 and 58 and gas discharge tube 60 in FIG. 2.

Figure 2:
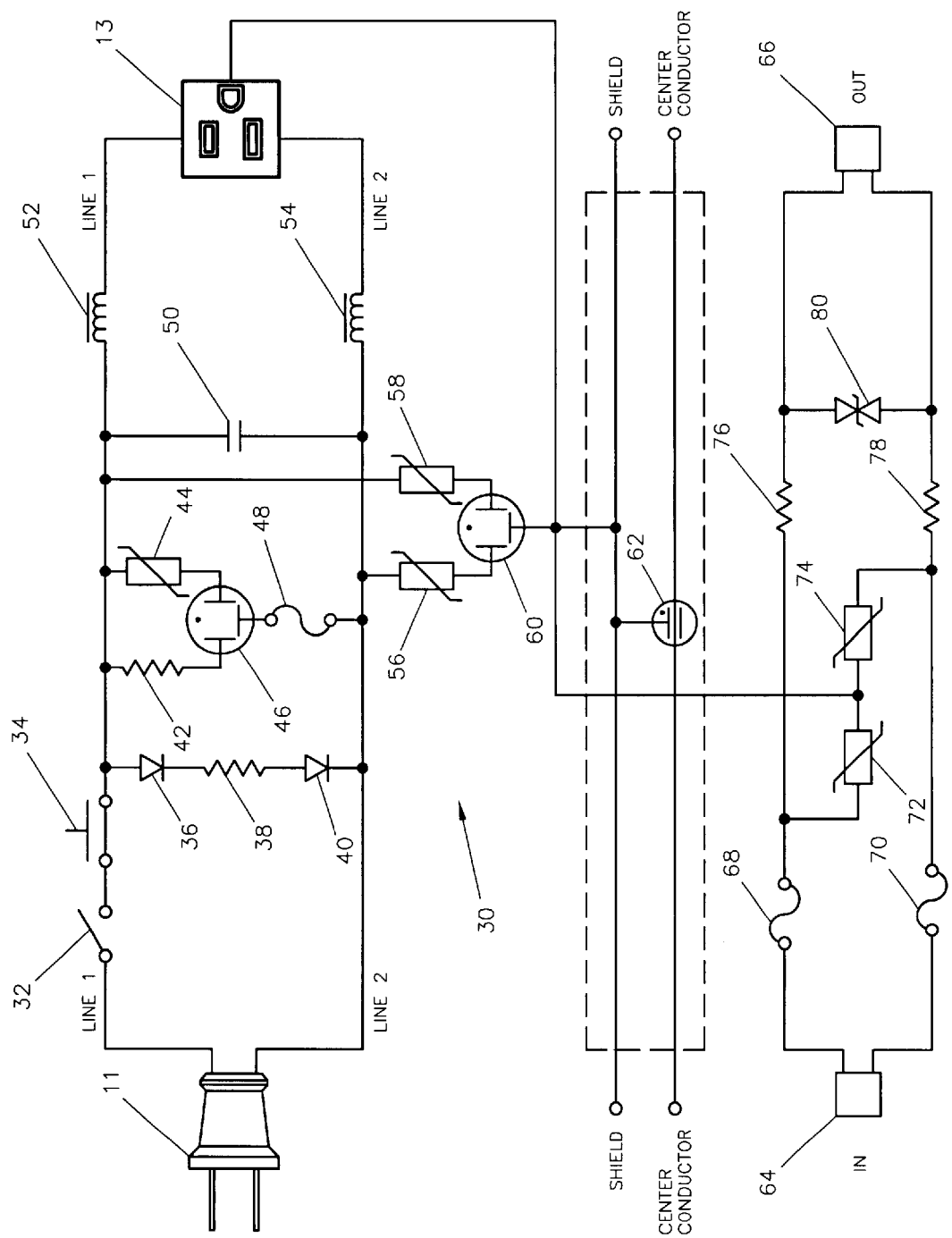
FIG. 2 is a schematic diagram of a second embodiment of the present invention.

FIG. 2 is a schematic diagram of another embodiment of the invention. As shown in FIG. 2, surge suppressor 30 protects against overvoltage conditions appearing on the AC power lines, a coaxial transmission line and a communication line. The AC power source may be 110 volts or 220 volts, while the coaxial transmission line may be a CATV or satellite TV dish or a broadband internet connection. The communication line may be a telephone line, a FAX line or a high speed data line such as 10 Base T. Surge suppressor 30 is connected to the AC power source by a two prong AC plug 11 and is connected to the electrical equipment to be protected by a receptacle 13 which accepts a three prong AC plug.

Switch 32 is an ON/OFF switch, while circuit breaker 34 protects against overcurrent conditions. Diode 36, resistor 38 and diode 40 provide a "power on" indication when switch 32 is turned on. Diode 36 may be a IN4007 type diode, resistor 38 may be 3.3K ohms while diode 40 may be an LED.

The combination of resistor 42, MOV 44, gas discharge tube 46 and fuse 48 comprise an AC overvoltage protection circuit which protects against voltage surges appearing across Line 1 and Line 2. Resistor 42 may be on the order of 30K ohms, while MOV 44 may be the same as MOV 14. Gas discharge tube 46 is a three electrode gas discharge tube. A suitable three electrode gas discharge tube is available from TII Industries under part number TII 11, which has a breakdown voltage between 300 and 500 VDC. Fuse 48 is a thermal sensing fuse which protects against overcurrent conditions and may be the same as fuse 12. Resistor 42 initiates the arc in gas discharge tube 46 when a voltage surge appears across Line 1 and Line 2. Resistor 42 reduces the transient produced when gas tube 46 goes into conduction. Capacitor 50, inductor 52 and inductor 54 form a low pass filter which also reduces the transient produced when gas tube 46 goes into conduction. Capacitor 50 may be between 0.1 and 0.47 microfarods, while inductors 52 and 54 may be between 10 and 15 millihenries.

The embodiment of the invention shown in FIG. 2 also provides overvoltage protection for voltage surges appearing on a coaxial transmission line having a shield and a center conductor. The coaxial transmission line overvoltage protection current comprises coaxial gas discharge tube 62 (described later in connection with FIG. 4), which may be the same as gas discharge tube 24. Connected in series with the shield side of gas discharge tube 62 is a virtual ground circuit comprising gas discharge tube 60 and MOVs 56 and 58. Gas discharge tube 60 may be the same as gas discharge tube 46 and MOVs 56 and 58 may be the same as MOV 14. The virtual ground circuit provides a return path for voltage surges appearing on the coaxial transmission line.

Surge suppressor 30 also provides overvoltage protection for a communication line connected between input jack 64 and output jack 66. Jacks 64 and 66 may, for example, be RJ11 or RJ45 jacks. Fuses 68 and 70 provide overcurrent protection and may be 350 MA fuses. MOVs 72 and 74 provide protection against voltage surges appearing on the communication line. Suitable MOVs are available from Harris Semiconductor Corp. under part number V120ZA6. Resistors 76 and 78 may be 10 ohms, while diode 80 is a bidirectional avalanche diode. A suitable diode is available from General Instrument Corp. under part number 1.5KE250. The virtual ground circuit comprising gas discharge tube 60 and MOVs 56 and 58 provides a return path for voltage surges appearing on the communication line.

Figure 3:
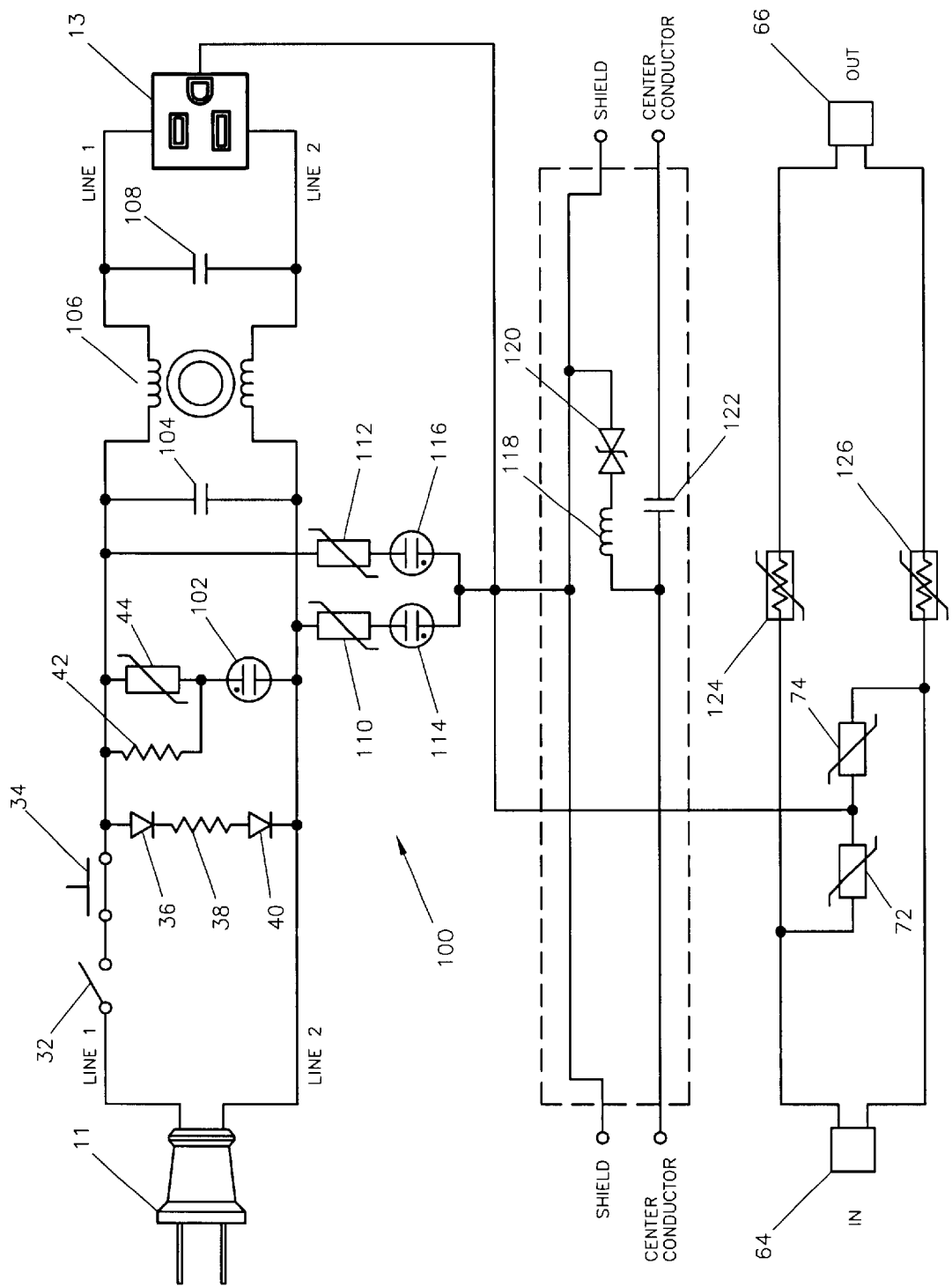
FIG. 3 is a schematic diagram of a third embodiment of the present invention.

FIG. 3 is a schematic diagram of another embodiment of the invention. In FIG. 3, surge suppressor 100 protects against overvoltage conditions appearng on the AC power line, a coaxial transmission line and a communication line. As with the embodiments shown in FIGS. 1 and 2, the AC power source is two wire and may be 110 volts or 220 volts. The coaxial transmission line and the communication line may be as described in connection with FIG. 2. Switch 32, circuit breaker 34 and the power on indicator circuit comprising diode 36, resistor 38 and diode 40 are all as described in connection with FIG. 2.

Overvoltage protection for the AC line is provided by the AC overvoltage protection circuit comprising resistor 42, MOV 44 and gas discharge tube 102. Resistor 42 and MOV 44 were previously described. Gas discharge tube 102 may be a TII 44 tube. As in FIG. 2, resistor 42 helps initiate the arc in gas tube 102, thereby reducing the transient produced when gas tube 102 goes into conduction. Capacitor 104, inductor 106 and capacitor 108 form a low pass filter which also reduces the transient produced when gas tube 102 goes into conduction. Capacitors 104 and 108 may be between 0.1 and 0.47 microfarads, while inductor 106 is a torroid having an inductance between 10 and 15 millihenries.

Surge suppressor 100 also protects against voltage surges appearng on the coaxial transmission line. The coaxial transmission line overvoltage protection circuit comprises series connected inductor 118 and avalanche diode 120. Inductor 118 may be 6.8 microhenries, while diode 120 may be a 1.5KE12V avalanche diode available from General Instrument Corp. Capacitor 122 passes the broadband signal on the coaxial transmission line and may be 0.01 microfarads, 1000 volts.

Surge suppressor 100 also protects against voltage surges appearing on the communication line. As in FIG. 2, jacks 64 and 66 may be RJ11 or RJ45 jacks. Overvoltage protection is provided by MOVs 72 and 74, which are the same as in FIG. 2. Overcurrent protection is provided by positive temperature coefficient resistors (PTCRs) 124 and 126. Suitable PCTRs are available from Raychem Corp., 300 Constitution Drive, Menlo Park, Calif. under part number TR600-150.

Return paths for overvoltage conditions appearing on the coaxial transmission line and the communication line are provided by the virtual ground circuit comprising MOVs 110 and 112 and gas discharge tubes 114 and 116. MOVs 110 and 112 may be the same as MOV 14. Gas discharge tubes 114 and 116 may be TII 44 tubes. While two two electrode gas discharge tubes 114 and 116 are shown in FIG. 3, a single three electrode gas discharge tube could also be employed. See MOVs 56 and 58 and gas discharge tube 60 in FIG. 2. Whether a single three electrode gas discharge tube is used, or whether two two electrode gas discharge tubes are used, is a matter of design choice. They are equivalent for this application.

FIG. 4 is a reproduction of FIG. 14 from U.S. Pat. No. 5,566,056 issued to Nisar Chaudhry on Oct. 15, 1996. FIG. 4 illustrates a coaxial surge arrestor which may be used in the coaxial transmission line overvoltage protection circuit in FIGS. 1 and 2. As explained at column 6, line 54 through column 7, line 51 of U.S. Pat. No. 5,566,056, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

As also shown in FIG. 4, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 4, the medium is an inert gas which has a dielectric constant of approximately one. Therefore, the impedance of the gas discharge tube varies between the insulating ends as the logarithm of the ratio D/d. The insulating ends 204 are preferably ceramic and ceramic has a dielectric constant of about eight. By varying the ratio D/d along the length of center conductor 206 one can compensate for changes in impedance caused by, Inter alia, the dielectric constants of the insulating ends 204. The portion of gas discharge tube 200 that is used for impedance matching is designated by the letter "I", to distinguish it from the active discharge region "G". See FIG. 14 of U.S. Pat. No. 5,566,056.

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two.

While the present invention has been described by reference to various preferred embodiments, it will be understood by persons skilled in the art that many modifications and variations may be made in those preferred embodiments without departing from the spirit and scope of the present invention.

What is claimed is:

1. A surge suppressor adapted to be connected to first and second AC power lines and which provides overvoltage protection without the need for a separate ground conductor, the surge suppressor comprising:

(a) an AC overvoltage protection circuit comprising at least one MOV connected between the AC power lines for protecting against voltage surges on the AC power lines;

(b) an AC power receptacle having two AC power terminals and a ground terminal and adapted to receive a three prong AC power plug, the AC power terminals for connection to the AC power lines; and (c) a virtual ground circuit connected between the ground terminal of the AC power receptacle and the AC power lines for providing a return path to the AC power lines for voltage surges appearing at the AC power receptacle, the virtual ground circuit comprising a first MOV connected between the ground terminal of the AC power receptacle and the first AC power line and a second MOV connected between the ground terminal of the AC power receptacle and the second AC power line.

2. A surge suppressor adapted to be connected to first and second power lines and which provides overvoltage protection without the need for a separate ground conductor, the surge suppressor comprising:

(a) an AC power plug having at least two conductors for connection to the AC power lines;

(b) an AC overvoltage protection circuit comprising at least one MOV connected between the AC power lines for protecting against voltage surges on the AC power lines;

(c) an AC power receptacle having two AC power terminals and a ground terminal and adapted to receive a three prong AC power plug, the AC power terminals for connection to the AC power lines; and (d) a virtual ground circuit connected between the ground terminal of the AC power receptacle and the AC power lines for providing a return path to the AC power lines for voltage surges appearing at the AC power receptacle, the virtual ground circuit comprising a first MOV connected between the ground terminal of the AC power receptacle and the first AC power line and a second MOV connected between the ground terminal of the AC power receptacle and the second AC power line.

3. The surge suppressor of claim 2 wherein the AC power plug has only two conductors.

4. The surge suppressor of any of claims 1, 2 or 3 further comprising a coaxial transmission line overvoltage protection circuit adapted to be connected to a coaxial transmission line having a shield and a center conductor for protecting against voltage surges on the coaxial transmission line.

5. The surge suppressor of any of claims 1, 2 or 3 further comprising a communication line overvoltage protection circuit adapted to be connected to a communication line for protecting against voltage surges on the communication line.

6. The surge suppressor of any of claims 1, 2 or 3 further comprising:

(a) a coaxial transmission line overvoltage protection circuit adapted to be connected to a coaxial transmission line having a shield and a center conductor for protecting against voltage surges appearing on the coaxial transmission line; and (b) a communication line overvoltage protection circuit adapted to be connected to a communication line for protecting against voltage surges on the communication line.

7. The surge suppressor of any of claims 1, 2 or 3 wherein the virtual ground circuit further includes at least one gas discharge tube connected in series with the two MOVs.

8. The surge suppressor of claim 4 wherein the coaxial transmission line overvoltage protection circuit comprises a coaxial gas discharge tube comprising a hollow conductive housing, insulating ends adapted to seal the housing, an inert gas sealed in the housing, a center conductor extending through the housing, the center conductor having a longitudinal axis oriented in a direction parallel to the direction of signal transmission, the diameter of the center conductor being varied along at least a portion of the length of the conductor within the housing for matching the impedance of the coaxial gas discharge tube to that of the coaxial transmission line.

9. The surge suppressor of claim 4 wherein the coaxial transmission line overvoltage protection circuit comprises an avalanche diode and an inductor connected in series.

10. The surge suppressor of any of claims 1, 2 or 3 wherein the AC overvoltage protection circuit further comprises a gas discharge tube connected in series with the MOV.

11. The surge suppressor of any of claims 1, 2 or 3 wherein the AC overvoltage protection circuit further comprises a thermal fuse connected in series with the MOV.

12. The surge suppressor of any of claims 1, 2 or 3 wherein the AC overvoltage protection circuit further comprises a gas discharge tube and a thermal fuse connected in series with the MOV.

* * * * *